United States Patent [19]

Ignatowski

[11] Patent Number: 6,027,213
[45] Date of Patent: Feb. 22, 2000

[54] JEWELRY ARTICLE ADAPTED FOR EXTENSION FROM EYEGLASSES

[76] Inventor: Patricia M. Ignatowski, 3125A S. 42nd St., Milwaukee, Wis. 53215

[21] Appl. No.: 09/098,406

[22] Filed: Jun. 16, 1998

Related U.S. Application Data

[60] Division of application No. 08/688,037, Jul. 26, 1996, Pat. No. 5,794,459, which is a continuation-in-part of application No. 08/637,195, Apr. 8, 1996, Pat. No. 5,675,988.

[51] Int. Cl.[7] ............................ A44C 25/00; G02C 11/02
[52] U.S. Cl. ...................... 351/52; 63/3; 63/3.1; 63/38; 351/51; 351/157; 351/158; D11/7; D11/8
[58] Field of Search ................... 63/33, 35, 38, 63/40, 3.1, 3, 4, 21, 23; 351/51, 52, 155, 156, 157, 158; 24/3.13, 3.3; D11/7, 8

[56] References Cited

U.S. PATENT DOCUMENTS

| | | | |
|---|---|---|---|
| D. 47,996 | 10/1915 | Guinis et al. | D11/2 |
| 129,871 | 7/1872 | Stevens | 63/3 X |
| D. 244,126 | 4/1977 | Ladjimi | D11/8 |
| 301,491 | 7/1884 | Gibbons | 63/21 X |
| D. 313,368 | 1/1991 | Peterson . | |
| D. 324,871 | 3/1992 | Cordet et al. . | |
| 1,683,545 | 9/1928 | Harris | 63/3.1 X |
| 2,086,468 | 7/1937 | Bryan | 63/3 X |
| 2,125,362 | 8/1938 | Scribner | 242/3.13 |
| 2,180,726 | 11/1939 | Bradley | 63/36 |
| 2,228,686 | 1/1941 | Bezault | 63/4 X |
| 2,244,944 | 6/1941 | Furlonge | 63/36 |
| 2,766,541 | 10/1956 | Quinones et al. | 41/34 |
| 2,779,523 | 1/1957 | Klimkiewicz | 63/3 X |
| 2,960,787 | 11/1960 | Quinones et al. | 41/34 |
| 3,010,365 | 11/1961 | Sadel | 88/52 |
| 3,163,026 | 12/1964 | Kenny | 63/14.2 |
| 4,153,346 | 5/1979 | Gomer | 351/52 |
| 4,471,509 | 9/1984 | Marks | 24/3 |
| 4,974,955 | 12/1990 | Treadaway | 351/123 |
| 4,974,956 | 12/1990 | Gill | 351/156 |
| 5,024,515 | 6/1991 | Beckemeyer et al. | 351/52 |
| 5,031,420 | 7/1991 | Song | 63/21 |
| 5,161,234 | 11/1992 | Nita | 351/52 |
| 5,414,907 | 5/1995 | Kiapos | 24/3.3 |
| 5,654,787 | 8/1997 | Barison | 351/52 |
| 5,675,988 | 10/1997 | Ignatowski | 63/38 |
| 5,794,459 | 8/1998 | Ignatowski | 63/38 |
| 5,896,184 | 4/1999 | Lowe et al. | 351/52 |

*Primary Examiner*—Terry Lee Melius
*Assistant Examiner*—Andrea Chop
*Attorney, Agent, or Firm*—Quarles & Brady LLP

[57] ABSTRACT

A jewelry article is adapted for attachment as an extension of the temple arm on conventional eyeglasses. The jewelry extension, or "glasstension", grips the temple arm with an elastic loop portion of a gripping member, and the gripping member in turn supports one or more elongated strands of jewelry type decorations, such as beads and charms. Each glasstension is a unitary piece, with the elongated decorative strands being securely affixed onto the gripping member. In one particular embodiment, the glasstension includes two or more decorative strands, and two additional gripping members attached at or near the ends of two of the decorative strands, allowing the glasstension to be converted from a single sided glasstension to a combined double sided glasstension and eyeglass retainer.

12 Claims, 5 Drawing Sheets

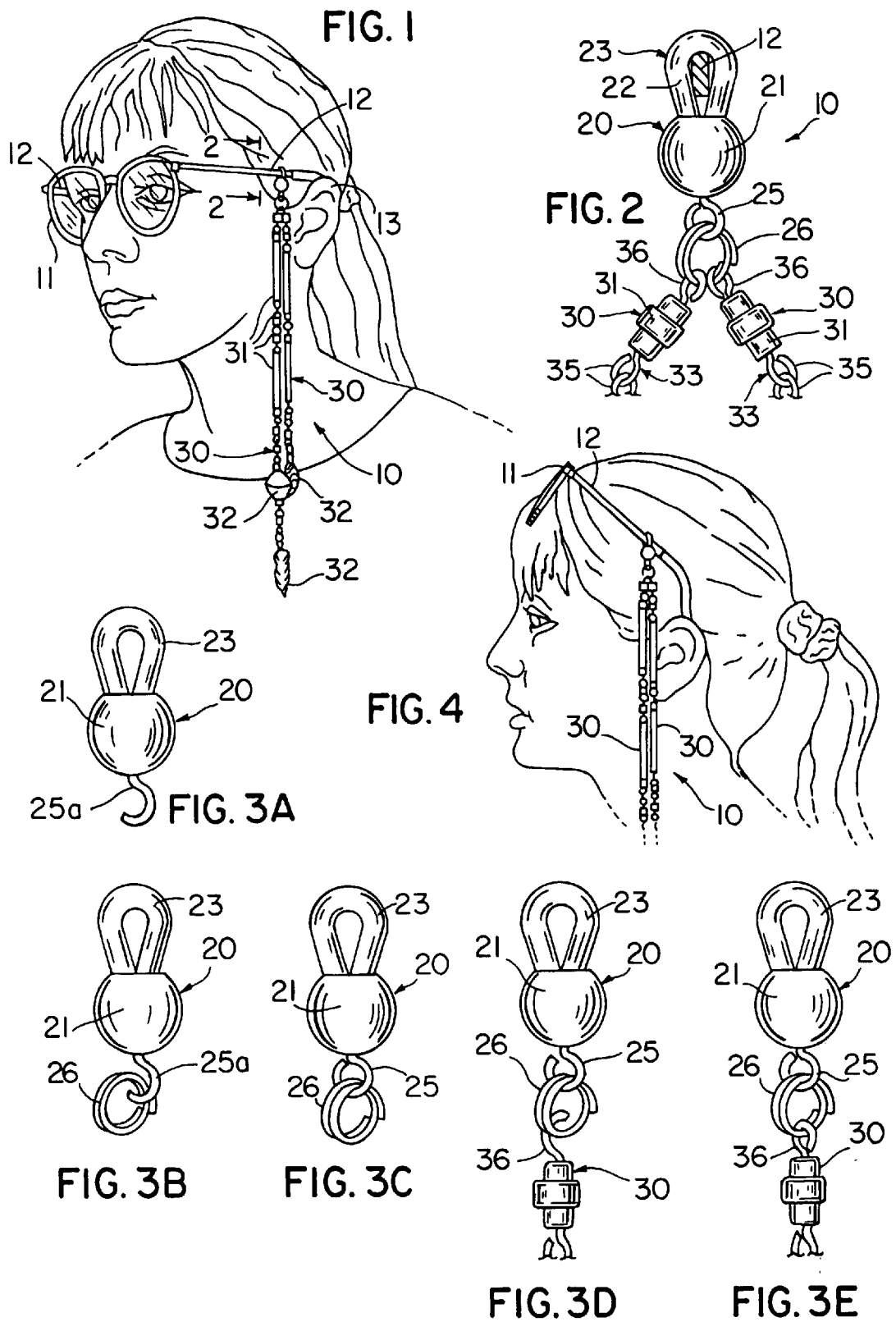

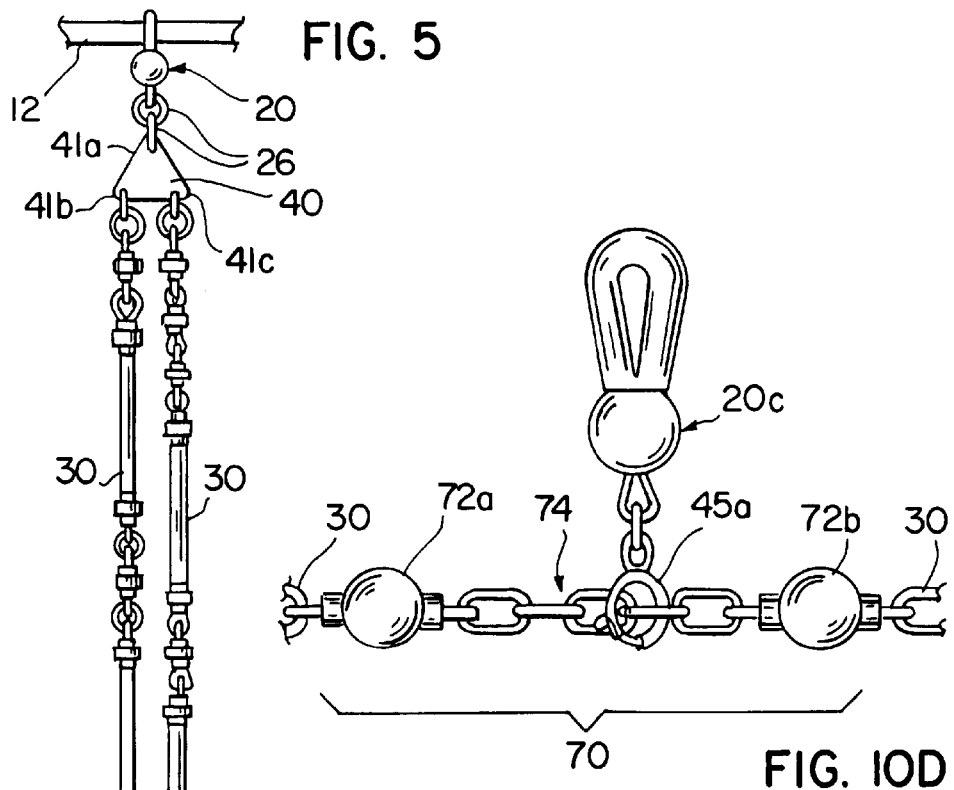
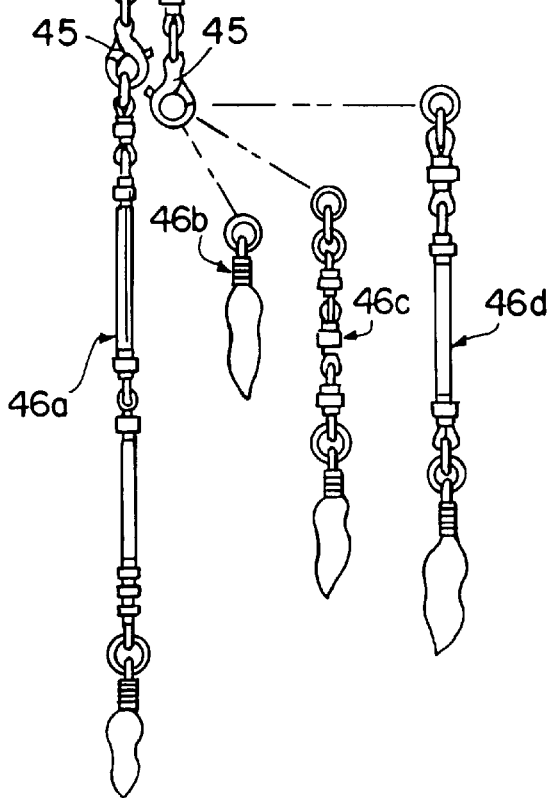

JEWELRY ARTICLE ADAPTED FOR EXTENSION FROM EYEGLASSES

CROSS-REFERENCE

This application is a divisional application of U.S. patent application Ser. No. 08/688,037, filed on Jul. 26, 1996, now U.S. Pat. No. 5,794,459 which is a continuation-in-part of U.S. patent application Ser. No. 08/637,195, filed on Apr. 8, 1996, now U.S. Pat. No. 5,675,988.

FIELD OF THE INVENTION

The field of the invention is jewelry, more particularly jewelry which is adapted for wearing as attached adornments about the users head.

BACKGROUND OF THE INVENTION

Jewelry articles which are used for adornment are commonly attached on or about the head area of the person using the jewelry. Traditionally, earrings have been a popular jewelry article of this type, and are available in a wide variety of sizes, shapes and styles. However, one factor which influences the design of earring style jewelry is that the size and weight of the jewelry are somewhat limited by the fact that the jewelry is directly attached to the user's earlobe. Even when pierced-ear style attachments are used, earrings which are either too heavy or large in size would both be uncomfortable and be prone to being tugged on when contacting other objects.

Another form of jewelry for use in the head area which has been used is known as "hair-extensions". Hair-extension jewelry usually consists of an elongated decoration, such as a string of beads or other charms, or may even include additional strands of the users own hair. Usually, the wearers hair is braided using a technique known as "corn rowing" to form a tight, thin, braid which is likewise called a "corn row" braid. In order to attach the elongated decoration, the end of the corn row braid is fitted with an attachment point, and the elongated decoration is attached thereto. While hair-extensions are a popular form of jewelry, they are somewhat limited in application, since the user is required to adopt a particular hair style and is required to perform a fairly time consuming preparation. Further, the actual decorative part of the hair-extension may extend well below the head and onto the users shoulders, and thus may not achieve the sought after result when a decoration for the users head is desired.

Thus, the known forms of jewelry for use on or about the users head are each associated with various limiting factors. Further, since jewelry design also includes a component of artistic expression, a need exists for new and imaginative ways utilizing jewelry which overcomes the limitations of prior forms for using such jewelry.

SUMMARY OF THE INVENTION

A jewelry article according to the present invention is particularly adapted for use with an eyeglass frame. The jewelry article includes first and second gripping members, each of which includes a loop which is slidably receivable on a temple arm of the eyeglass frame. First and second decorative strands each have a first end which is connected to one of the respective first and second gripping members. The opposite, or second end of each first and second decorative strand is attached to an attachment anchor, which serves to connect the two strands together to form a necklace portion. In addition, the attachment anchor provides a means for attaching a third gripping member, with the third gripping member also being slidably receivable on a temple arm of the eyeglass frame.

An object of the invention which is achieved by the above described structure is to provide a article of jewelry which is convertible between a first operative configuration and a second operative configuration. In the first operative configuration, the first and second gripping members are detached from the temple arms of the eyeglasses and left loose. Then, the attachment anchor is free for attachment to the third gripping member on a single one of the eyeglass temple arms. In that configuration, the two decorative strands hang together, in parallel, from their common attachment to the attachment anchor, and thus provide a single sided decoration suspended from a single temple arm of the wearer's eyeglasses. To convert to the second operative configuration, the attachment anchor is removed from its attachment to the temple arm, and is instead left loose, but still connecting together the two decorative strands. The decorative strands, connected together in that manner, are effectively a long, continuous connection, which serves as a necklace portion in the second operative configuration. The loops of the first and second gripping members are then placed over opposite temple arms of the eyeglass frame, and the longer, necklace portion may be worn around behind the wearer's neck. In this configuration, the jewelry article provides both a double sided decorative effect as well as a capability to function as an eyeglass retainer. Since the decorative strands are already designed to achieve a desired adorning effect, as in the first, or single sided configuration, the same ornamentation continues to provide the desired attractive appearance when used in the second, or double sided configuration. But the longer necklace portion, together with the double sided grip on the eyeglass frame, further permit the jewelry article to be used as a conventional eyeglass retainer, e.g. by removing the eyeglasses and hanging them down on the front of the wearer's chest.

In one aspect of the invention, the two decorative strands may be formed with different lengths, so that when worn in the first, or single sided configuration, the two ends hang at different positions. When these ends are adorned with further jewelry accessories, the offset ends serve to accentuate and spread out the jewelry accessories for a larger and more noticeable overall appearance.

In another aspect of the invention, the first and second gripping members may be attached to the first and second strands, respectively, at an attachment point located between the first and second ends of each decorative strands. This structure forms a terminal end on each decorative strand which extends beyond the attachment point to provide a decorative effect in both the first and second operative configurations. Specifically, when worn in the first, or single sided configuration, the terminal ends hang roughly in-line with the remainder of the decorative strands, since both decorative strands, and the attached first and second gripping members, hang approximately vertically. Then, in the second, or double sided configuration, the first and second gripping members are attached to opposite temple arms. The terminal ends then pivot to hang down along side the remainder of the respective decorative strand, instead of being in-line, which provides a more dense concentration of the jewelry near the visible portions at the temple arm. This effect can be further enhanced by providing a means for attaching additional jewelry accessories at the point where the first and second gripping members attach to the respective first and second decorative strands. In that case, the jewelry accessories function in the same manner as the terminal ends, e.g. as an enhancement to either the single sided or double sided appearance. Further, the attachment of additional jewelry accessories may be accomplished in a releasable manner, such that different jewelry accessories may be readily added, removed, and interchanged. Alternatively, a similar effect can be accomplished by attaching jewelry articles at spaced apart locations extending back from first and second gripping members towards the attachment anchor.

In yet another aspect of the invention, the attachment anchor itself may be formed in a manner which contributes to the overall decorative effect of the jewelry article. For example, the attachment anchor is formed by a decorative member having a solid body formed with separate attachment points for the third gripping member and the first and second decorative strands. For this purpose, a triangular shaped jewelry member is suitable, and may be stamped, engraved, painted, or otherwise decorated to be both functional and decorative.

A further object of the invention is to provide a jewelry article of the above described type in which the third, or middle gripping member is removable. The attachment anchor provides a fixed point for joining the two strands. However, the third gripping member may be removably attached to the attachment anchor. This allows the third gripping member to be removed altogether when the jewelry article is used in the second, or double sided configuration. Several forms of releasable attachment are possible, including a releasable clasp fixedly attached onto either the third gripping member or the attachment anchor. In one particular form of the invention, the attachment anchor may be formed by an intermediate strand connected between two stopping members. In that case a releasable clasp fixedly attached onto the third gripping member may releasibly engage the intermediate strand and be held captive between the two stopping members.

Another object of the invention is to provide a jewelry article of the above described type which provides for the releasable attachment of additional jewelry accessories, such as, for example, charms, mounted stones, and other beaded or chain strands. This object is accomplished by including a releasable clasp at the end of one or more of the decorative strands, onto which any number of previously formed jewelry accessories may be readily added, removed, or interchanged.

These objects, together with other objects and advantages which will be apparent from the following description, in which reference is made to the accompanying drawings which form a part hereof. The full scope of the invention is not limited to such descriptions, but is set forth in the claims below.

BRIEF DESCRIPTION OF THE DRAWINGS

FIG. 1 is a perspective view showing a jewelry article according to the invention in use;

FIG. 2 is a section view taken on line 2—2 of FIG. 1;

FIGS. 3A–3E are plan views showing a construction sequence for the jewelry article of FIG. 1;

FIG. 4. side elevational view showing the jewelry article of FIG. 1 in an alternative orientation of use;

FIG. 5 is a plan view of a second embodiment of a jewelry article according to the invention;

FIGS. 10a–10d are detailed views of alternative attachment anchors which may be used as a part of the jewelry article according to the third embodiment of the invention;

DESCRIPTION OF THE PREFERRED EMBODIMENT

Figure 6:
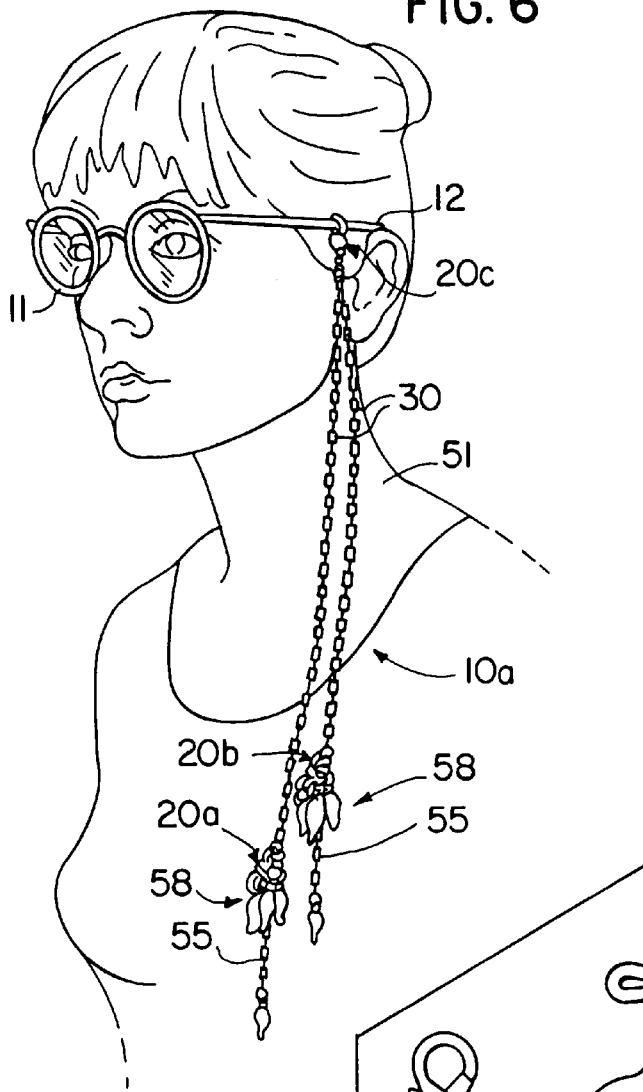
FIG. 6 is a perspective view of a jewelry article according to a third embodiment of the invention being used in a first operative configuration.

Referring to FIG. 1, an article of jewelry 10 according to the present invention is adapted for use in conjunction with an eyeglass frame 11 worn by the user. In that regard, the jewelry article 10 has the appearance of being an adjunct to, and an extension of the eyeglass frame 11, and for that reason is referred to herein as a "glasstension" 10. As with other jewelry forms, the glasstension 10 is an artistic decoration, which permits adornment of the user in a new and innovative manner. Eyeglasses are usually worn out of necessity, either for correction of visual acuity or for reduction of brightness and glare (i.e. sunglasses), and are normally regarded as being undesirable from an appearance standpoint. However, the glasstension 10 now provides the wearer a new form of personal expression, since the glasstension 10 may be formed with a wide variety of jewelry styles and arrangements within the scope of the invention.

Referring to FIGS. 1 and 2, the eyeglass frame 11 includes temple arms 12 extending from the front of the frame to the top, and possibly around behind the users ear 13, with the temple arms terminating in an open end 14. The glasstension jewelry 10 includes a gripping member 20 which is slidably receivable over the open end of the temple arm 12 to be positioned on the temple arm 12 forward of the users ear 13. Because the glasstension jewelry 10 according to the invention is formed as a unitary jewelry item, the glasstension 10 may be used individually on only one temple arm 12 as illustrated in this embodiment, or alternatively may be used in either matched or unmatched pairs on both temple arms 12. Further, the unitary construction of the glasstension 10 also permits attachment of multiple glasstensions 10 in an unbalanced fashion on the temple arms 12. For example, two or three glasstensions 10 may be placed on one temple arm 12, while the other temple arm is left without any. Thus, the wearer is free to express either a symmetrical or asymmetrical appearance by altering the number and order of glasstension jewelry 10 on the temple arms 12.

Again referring to FIGS. 1 and 2, the gripping member 20 includes a main body 21 which cinches the ends of an elastic cord material 22 to form an elastic loop 23 extending upwardly from the main body 21. The gripping member 20 also includes a small loop 25 which is preferably formed of a malleable metal extending downwardly from the main body 21. The loop 25 radially encircles an intermediate closed ring 26, so that the loop 25 and the intermediate closed ring 26 together form an attachment member for securely attaching one or more elongated decorative strands 30 which form the visually attractive part of the glasstension jewelry 10. Alternatively, the attaching member may be formed as a second downwardly depending elastic loop, although the preferred structure is the aforementioned combination of loop 25 and ring 26. Gripping members 20 of this general type have been known to be used in pairs to form retaining necklaces for eyeglasses 11, and are adaptable for use in this invention as described in detail below. For example, so called "eyeglass holders" suitable for use as the gripping members 20 in this invention are available from River Gems and Findings of Albuquerque, N.M. The intermediate closed ring 26 may be formed as a solid torus of metal or other suitable material, or may alternately be formed as a so called "double ring", where a metallic wire is wrapped twice around in a circle. In the preferred form, small jeweler's double rings may be used, such as those available from Darice inc., of Strongsville, Ohio.

Still referring to FIGS. 1 and 2, the elongated decorative strands 30 may be formed in a wide variety of known jewelry styles. In the illustrated embodiment, two elongated decorative strands 30 are shown, each of which is formed as a combination of beads 31 and assorted charms 32 strung together by interlinked jewelry wire 33. The jewelry wire 33 passes through hollow centers of the beads 31 and charms 32 along the length of the elongated decorative strands 30. Links between adjacent sections of the jewelry wire 33 are formed by bending the ends of the jewelry wire to form interlocking loops 35. Likewise, each elongated decorative strands 30 is preferably connected to the intermediate closed ring 26 by bending the topmost end of the jewelry wire radially around the intermediate closed ring 26 to form a terminal loop 36. The other end of each elongated decorative strand 30 may, for example, be terminated with one of the charms 32, also attached by forming a loop in the jewelry wire 33 around a corresponding loop (not shown) on the desired charm 32.

With the connections as described above, note that the elongated decorative strands 30 are securely affixed onto the intermediate closed ring 26. While some types of releasable jewelry clasps are known, such clasps are usually small and frail, and would thus be prone to failure given the weight and tugging forces that the elongated decorative strands 30 may be subjected to. Furthermore, releasability between the elongated decorative strands 30 and the gripping member 20 is not required in this invention, since the entire combination of the gripping member 20 and the securely attached elongated decorative strands 30 forms a unitary jewelry item which is designed to be changed only as a unit, e.g. by being slid on and off of the temple arm 12 of the eyeglass frame 11.

Referring now to FIGS. 3A–3E, the preferred construction of the glasstension 10 can now be described. As mentioned above, a preferred form for the gripping member 20 is a prefabricated eyeglass holder, which is manufactured with a closed eye-loop depending from the main body. This closed eye-loop may be pryed open with a small jeweler's pliers to present an open loop as shown in FIG. 3A. Then the intermediate closed ring 26 (such as the above mentioned commercially available "double ring" as illustrated) is placed over the open loop as shown in FIG. 3B, and the loop may then be bent back to the closed position as shown in FIG. 3C. In a similar manner, the topmost link of each elongated decorative strand 30 is first opened and placed over the intermediate closed ring 26 as shown in FIG. 3D, and then closed to complete the attachment as shown in FIG. 3E.

Referring to FIG. 4, people who wear eyeglasses sometimes desire to move the eyeglasses from the operative position directly in front of their eyes, to a holding position where the front of the eyeglass frame 11 rests atop of the wearers head. This is a common expedient, particularly when sunglasses or "reading only" eyeglasses are used. This popular use of eyeglasses is not only readily accommodated, but in fact the glasstension 10 according to the present invention continues to provide an adorning quality even though the eyeglasses 11 have been moved to a non-operative position. In particular, since the joint between the gripping member 20 and the elongated decorative strands 30 is free to swivel, the elongated decorative strands 30 will still be drawn under gravity to an approximately vertical orientation. The elongated decorative strands 30 will also still be approximately in the same general area of the wearer's head, and thus continue to provide the desired accentuating effect.

Referring to FIG. 5, in another preferred form of the invention, a coupling member 40 attaches to the gripping member 20 using one or more intermediate rings 26. The coupling member 40 may be formed with three or more apexes 41a–41c, as in the triangular shape shown. The coupling member 40 itself is preferably decorated, as by engraving of a pattern or image, or by painting or other accentuating through the use of color, although it is shown as a simple shape for simplicity. Such decorative coupling members 40 have been known and used in the art for other jewelry purposes. Each apex 41a–41c of the coupling member 40 includes a hole for use as an attachment point. The hole in apex 41a of the coupling member 40 attaches to the intermediate ring 26 for connection to the gripping member 20, while the holes in the other apexes 41b and 41c each connect to a single decorative strand 30.

The embodiment of FIG. 5 further contemplates that the decorative strands 30 may terminate in a releasable clasp 45, such as the illustrated "lobster claw" clasp, as it is known in the art. Of course, any other type of releasable jewelry clasp may be used as well. By terminating with the releasable clasp 45, the glasstension 10 in this embodiment is supportive of conventional jewelry accessories 46a–46d, which might have been used, for example, in conjunction with the previously know hair extensions. One factor which has contributed to the popularity of hair extensions has been the ability to collect many different strands, charms, and other jewelry attachments to permit the wearer to personalize their appearance and to vary their appearance from time to time. Consequently, many people have already acquired a collection of such personalized hair-extension type accessories 46a–46d, and these can now be used with the glasstension 10 by attachment to the releasable clasp 45. For example, if a person had previously used traditional hair-extensions, but no longer does so because of a change in hair style, or because of the painstaking and time consuming preparation required, the same hair-extension accessories 46a–46d can now be used without regard to hair style and with negligible preparation. In fact, drawn-back or short hair styles all but preclude the use of traditional hair-extensions, but go particularly well with glasstensions 10, since the jewelry is all the more visible. Thus, the invention provides an alternative use of hair-extension type accessories 46a–46d which may otherwise be seldom used or obsolete.

Still referring to FIG. 5, when fitted with the releasable clasp 45, the strands 30 are preferably formed with a length shorter than the ultimately desired length, since the attachment of further devices 46a–46d is expected to add some length. Typically, the strands 30 in this form of the invention may be from two to eight inches in length from the attachment member 20 to the releasable clasp 45. Also, when multiple strands 30 are used, the releasable clasps 45 may be offset from one another by forming the strands 30 with different lengths. The difference in length may be only a small amount, as illustrated, so that the clasps 45 do not interfere with each other, or may be a greater difference in length to provide a greater contrasting appearance between the strands.

Figure 7:
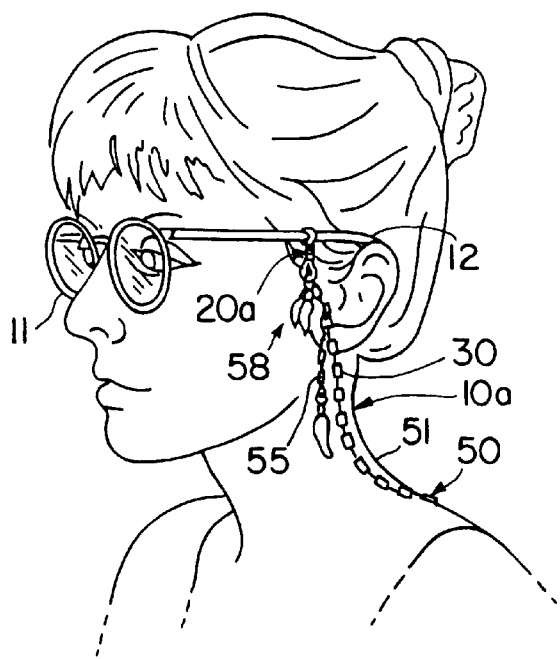
FIG. 7 is a perspective view of the jewelry article of FIG. 6 being used in a second operative configuration.
Figure 8:
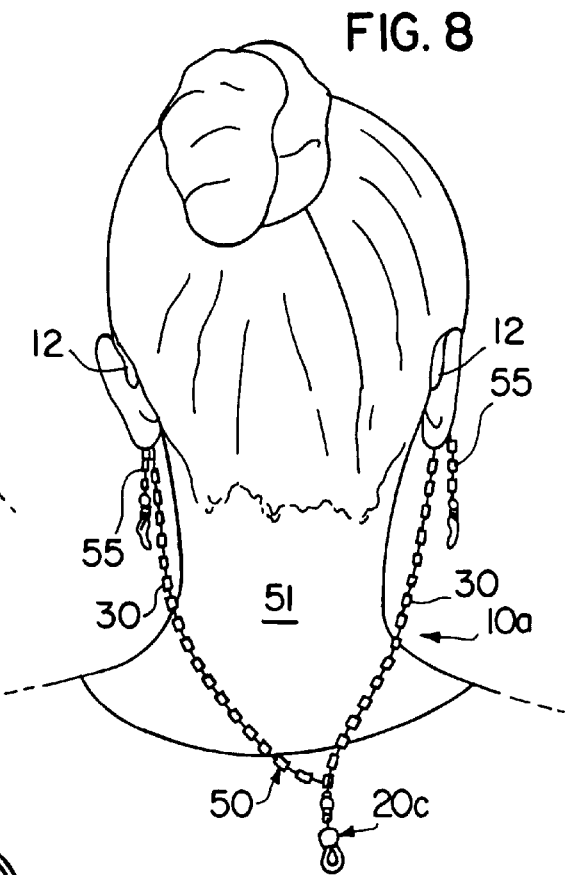
FIG. 8 is a rear view of the jewelry article of FIG. 7.

Referring now to FIGS. 6–8, an alternative glasstension 10a according to another novel embodiment is readily convertible between two different operative configurations. The alternative glasstension 10a includes three different gripping members 20a–20c which are arranged to permit the glasstension to be used in both a first operative configuration as a single-sided glasstension, and in a second operative configuration as a combined double-sided glasstension and eyeglass holder. In the first operative configuration (FIG. 6), the glasstension 10a is attached to a single temple arm 12 of the wearer's eyeglasses 11 by the third gripping member 20c, and includes two or more decorative strands 30 which drape to one side of the wearer's head. Thus, in the FIG. 6 configuration, the glasstension 10a has an appearance much the same as in the embodiment of FIG. 1, and provides all of the previously described advantages of the basic glasstension invention. However, the modified glasstension 10a also includes first and second gripping members 20a and 20b, respectively, which are each disposed along one of the strands 30. When the glasstension 10a is worn as shown in FIG. 6, the first and second gripping members 20a and 20b are relatively unobtrusive, being somewhat obscured by other attachments, as will be described in detail later.

Referring primarily to FIGS. 7 and 8, the first and second gripping members 20a and 20b permit the glasstension 10a to be converted to the second operative configuration, in which the glasstension 10a has separate utility as an eyeglass retainer, as well as continuing to provide a decorative glasstension appearance. In this configuration, the first and second gripping members 20a and 20b are each attached to opposite temple arms 12 on the wearer's eyeglasses 11, and the previously attached third gripping member 20c is detached and left loose. The aforementioned two strands 30 remain connected at the junction where they attach to the third gripping member 20c, and thus in effect form a continuous strand, or necklace portion 50 extending behind the wearer's neck 51. The necklace portion 50 formed by the strands 30 permits the glasstension 10a to function as a conventional eyeglass retainer if the eyeglasses 11 are removed from the operative position (FIGS. 7 and 8) and draped down the user's chest in the conventional manner (not shown).

Figure 9:
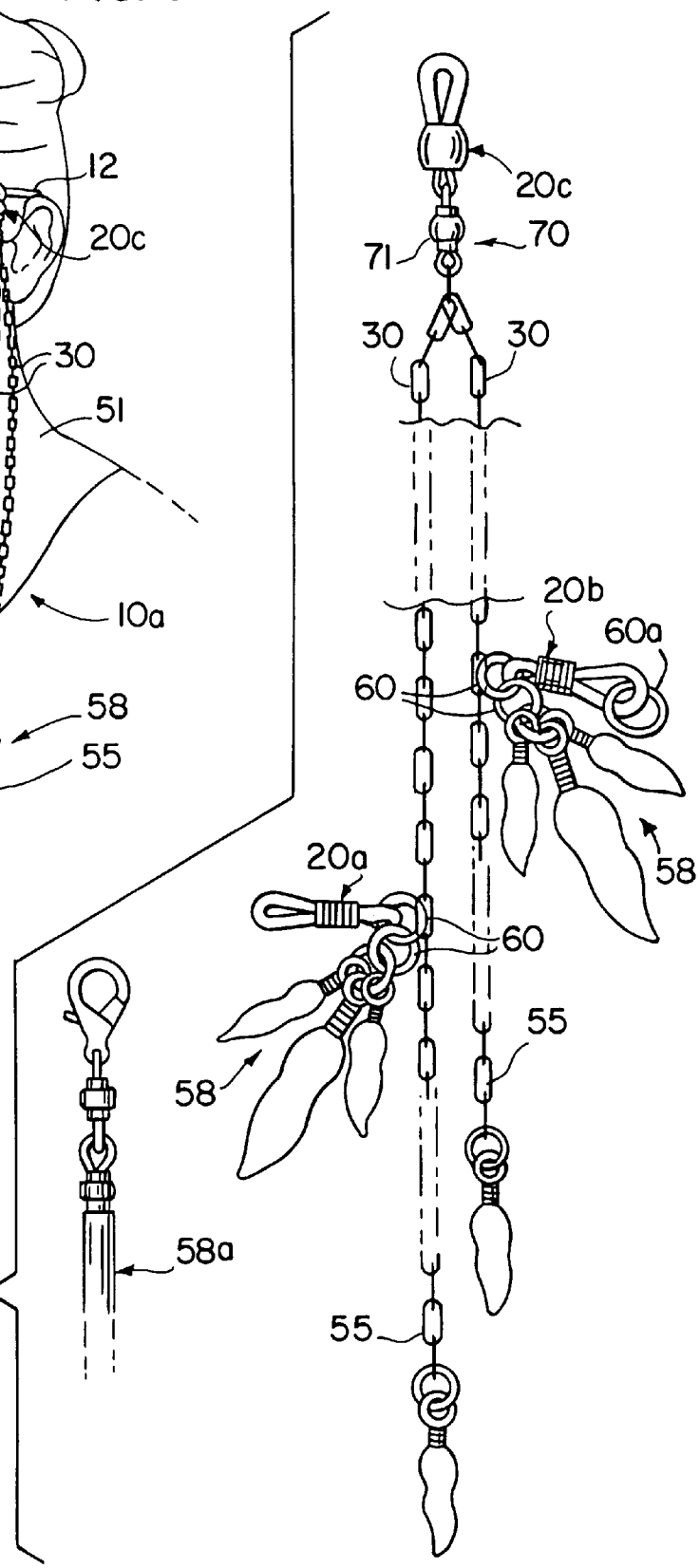
FIG. 9 is a plan view of the jewelry article of FIGS. 6–8.

Referring to FIGS. 7–9, the first and second gripping members 20a and 20b attach to the strands 30 at points towards the end of each respective strand 30, but far enough back from the ends of the strands 30 so as to leave a terminal end 55 on each strand 30. Thus, the terminal end 55 of each strand 30 extends beyond the first and second gripping members 20a and 20b, respectively. In the first operative configuration of FIG. 6, the terminal ends 55 fall under gravity to appear as straight-line extensions of the upper portions of the respective strand 30. Decorative charms, beads, or other adornment, shown generally as jewelry attachments 58, are preferably attached to each strand 30 at the attachment point for the respective first and second gripping members 20a and 20b, and serve to both provide a decorative effect and to make the first and second gripping members 20a and 20b less readily noticeable. Then, when the glasstension 10a is worn in the configuration of FIGS. 7 and 8, the terminal ends 55 pivot around the attachment points for the first and second gripping members 20a and 20b to hang approximately vertically, and combine with the necklace portion 50 to appear as glasstensions extending from both temple arms 12. Thus, the glasstension 10a is convertible from a single-sided glasstension which is decorative only, to a double sided glasstension which is both decorative and functional (e.g. as an eyeglass retainer).

Referring primarily to FIGS. 6, 8 and 9, note that the attachment points for the first and second gripping members 20a and 20b are preferably offset from one another. This arrangement serves to distribute the jewelry attachments 58 which accompany the first and second gripping members 20a and 20b, and therefore provide a generally improved appearance when the glasstension 10a is worn in the FIG. 6 configuration. Consequently, the third gripping member 20c will lie offset slightly from the exact back of the wearer's neck 51 when worn in the configuration of FIGS. 7 and 8. The offset of the third gripping member 20c in the latter configuration has no significant detrimental effect, but is merely a consequence of the unequal lengths of the strands 30 between the third gripping member 20c and the first and second gripping members 20a and 20b. Even though some degree of offset is preferred, the invention fully contemplates that the amount of offset may be varied more or less from that which is shown, and may even be eliminated to position the first and second gripping members 20a and 20b at symmetrical positions along the strands 30 with respect to the third gripping member 20c.

Referring now to FIG. 9, the set of jewelry attachments 58 may include any combination of fixed and removable decorative attachments, including charms, mounted stones or gems, and other extending strands, such as removable jewelry attachment 58a illustrated. Fixed attachments may be made using any known expedient, including double rings 60 extending through chain links or any other convenient attachment point. Note that the first and second gripping members 20a and 20b are illustrated as being cinched, double elastic loops, where an attachment ring 60a may even be used as an attachment point by encircling one of the elastic loops which is ultimately used to grip the temple arm 12 in the second operative configuration of FIGS. 7 and 8. A releasable clasp (not shown) may also be provided at these points for the attachment of other hair-extension type jewelry, as described above in relation to FIG. 5.

Figure 10A:
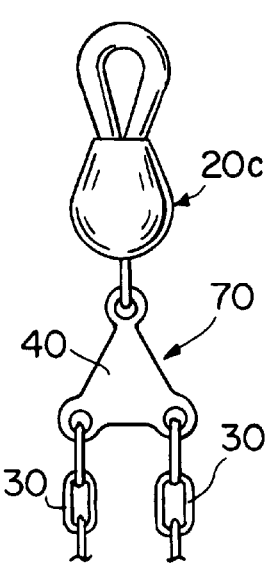

In general terms, the necklace portion 50 of the glasstension 10a includes an attachment anchor 70 which serves to provide an attachment point for the third gripping member 20c and thus to separate the two strands 30. In FIG. 9, the attachment anchor 70 is shown as using a decorative coupling bead 71 which fixedly links into the chain which forms the strands 30. Of course, any equivalent attachment may be used, without necessarily using the decorative coupling bead 71. For example, FIGS. 10a–10d illustrate several alternative preferred forms for the attachment anchor 70. In FIG. 10a, a triangular shaped decorative coupling member 40, similar to that described above in relation to FIG. 5, may be used as the attachment anchor 70. In that case, both strands 30 may be fixedly attached onto two different corners of the coupling member 40, and the third gripping member may likewise be fixedly attached onto the third corner.

Figure 10B:
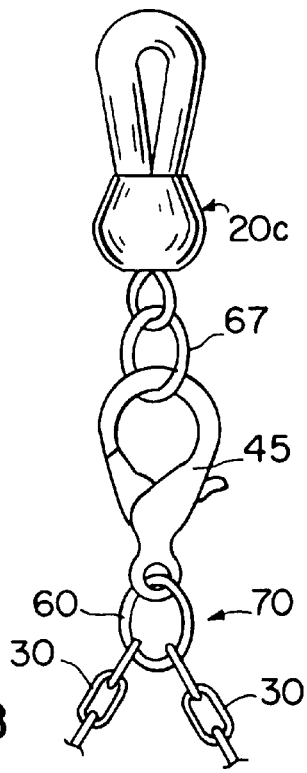
Figure 10C:
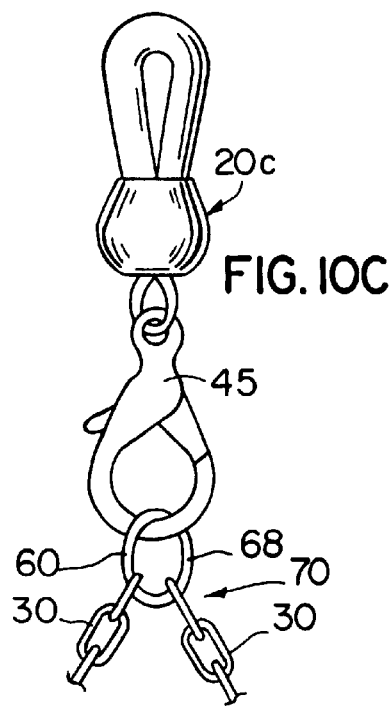

The invention also contemplates that the third gripping member 20c may be releasably attached to the glasstension 10a, as shown in FIGS. 10b–10d, in which case the third gripping member 20c can be removed when not needed, e.g. in the second, or eyeglass retainer configuration (FIGS. 7 and 8). The releasable attachment may be formed either as a releasable clasp 45 fixed onto the strands 30 which engages a fixed loop 67 on the third gripping member 20c (FIG. 10b), or as a releasable clasp 45 fixed onto the third gripping member 20c which engages a fixed loop 68 connecting the strands 30 (FIG. 10c). In these cases, the attachment anchor 70 is the portion which is fixedly attached to, and forms a part of the necklace portion 50, e.g. the clasp 45 and ring 60 of FIG. 10b, but only the ring 60 of FIG. 10c.

In FIG. 10d, another form of releasable attachment for the third gripping member 20c is shown. In this case, the attachment anchor 70 is formed by two stopping members 72a and 72b which are connected together by an intermediate strand 74. A smaller diameter releasable jewelry clasp 45a, when attached around the intermediate strand 74, is held captive between the two stopping members 72a and 72b, illustrated as larger diameter beads in FIG. 10d. The attachment anchor 70, (intermediate strand 74 and beads 72a and 72b) are attached in-line between the strands 30 to complete formation of the necklace portion 50. The jewelry clasp 45a may be, for example, a circular clasp with a spring loaded semi-circular arm 75 which is retractable to expose an open segment. Clasps of this type are generally known for attaching jewelry of various kinds. The clasp 45a is fixed onto the third gripping member 20c. When attached over the intermediate strand 74, the clasp 45a, and thus the attached third gripping member 20c, are free to slide laterally along the intermediate strand 74, but are held captive between the beads 72a and 72b. It should be understood that in addition to the illustrated beads 72a and 72b, other types of stopping members may be used, provided that the clasp 45a is not able to pass over them. This permits the use a wide variety of decorative pieces to be used as the stopping members 72a and 72b. The attachment of FIG. 10d is therefore particularly advantageous in that when the glasstension 10a is used in the configuration of FIGS. 7 and 8, the third gripping member 20c may be removed completely, and even though the attachment anchor 70 remains as a part of the necklace portion 50, it has a wholly decorative appearance, without fixedly attached clasps or rings. Further, the length of the intermediate strand 74 may be varied from a short length (under an inch) to provide fairly precise positioning of the strands 30, to longer lengths of several inches, which permit the strands 30 to be re-positioned by sliding the clasp 45a along the intermediate strand 74 to provide different effective lengths and offsets for the strands 30.

Referring again to FIGS. 10a–10d, it should further be appreciated that the combination of the third gripping member 20c, the attachment anchor 70, and the depending decorative strands 30 are sufficient within themselves to define a glasstension. In other words, even though these elements have been described in the context of a convertible glasstension 10a as in the embodiment of FIGS. 6–9, the same elements may be used alone to form a single sided glasstension, as in the other embodiments described herein. For example, other embodiments of glasstensions according to the invention may be formed using a gripping member (e.g. gripping member 20c) and an attachment anchor 70 coupled to two or more decorative strands 30, without necessarily including the first and second gripping members 20a and 20b, since these elements alone define a glasstension. If the first and second gripping members 20a and 20b are not used, and the attachment anchor 70 is fixedly attached onto the gripping member 20c, then these embodiments would be similar to the other embodiments of FIGS. 1–5 and may be used in the same manner and with the same variation (e.g. terminating in a releasable clasp 45 as in the embodiment of FIG. 5). However, when the attachment anchor 70 is releasably attached to the gripping member 20c as in FIGS. 10b–10d, then the glasstension formed has the further advantages of both interchangability and the ability to combine multiple attachment anchors onto a single gripping member 20c. Thus, the attachment anchors 70, with their attached strands 30, may be readily exchanged between gripping members 20c, or alternatively combined onto a single gripping member 20c to create a glasstension with a greater number of strands, and therefore a fuller and more dense appearance, and this may be accomplished without necessarily including the first and second gripping members 20a and 20b. In addition, due to the releasable nature of the connection between the third gripping member 20c and the attachment anchor 70, other jewelry attachments, such as shown at 46a–46d, 58, or 58a are also usable with a single sided glasstension based on the third gripping member 20c and releasable attachment anchor 70 of FIGS. 10b–10d.

Figure 11:
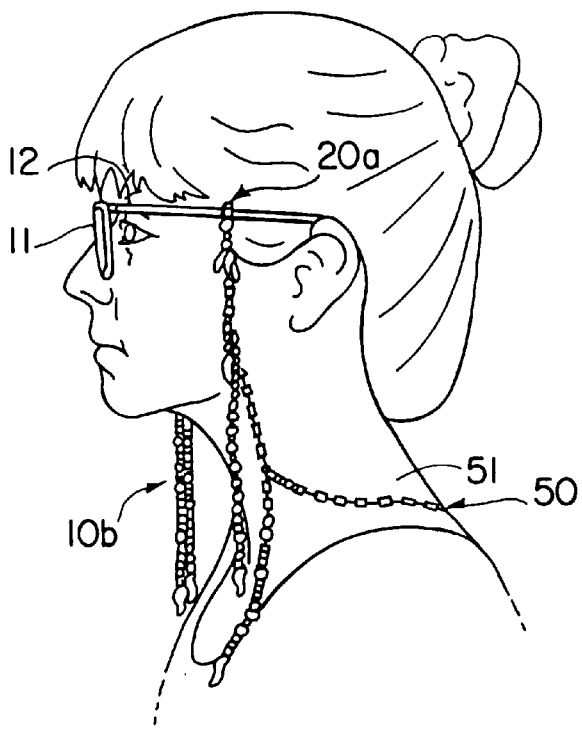
FIG. 11 is a side view of a jewelry article according to a fourth embodiment of the invention.
Figure 12:
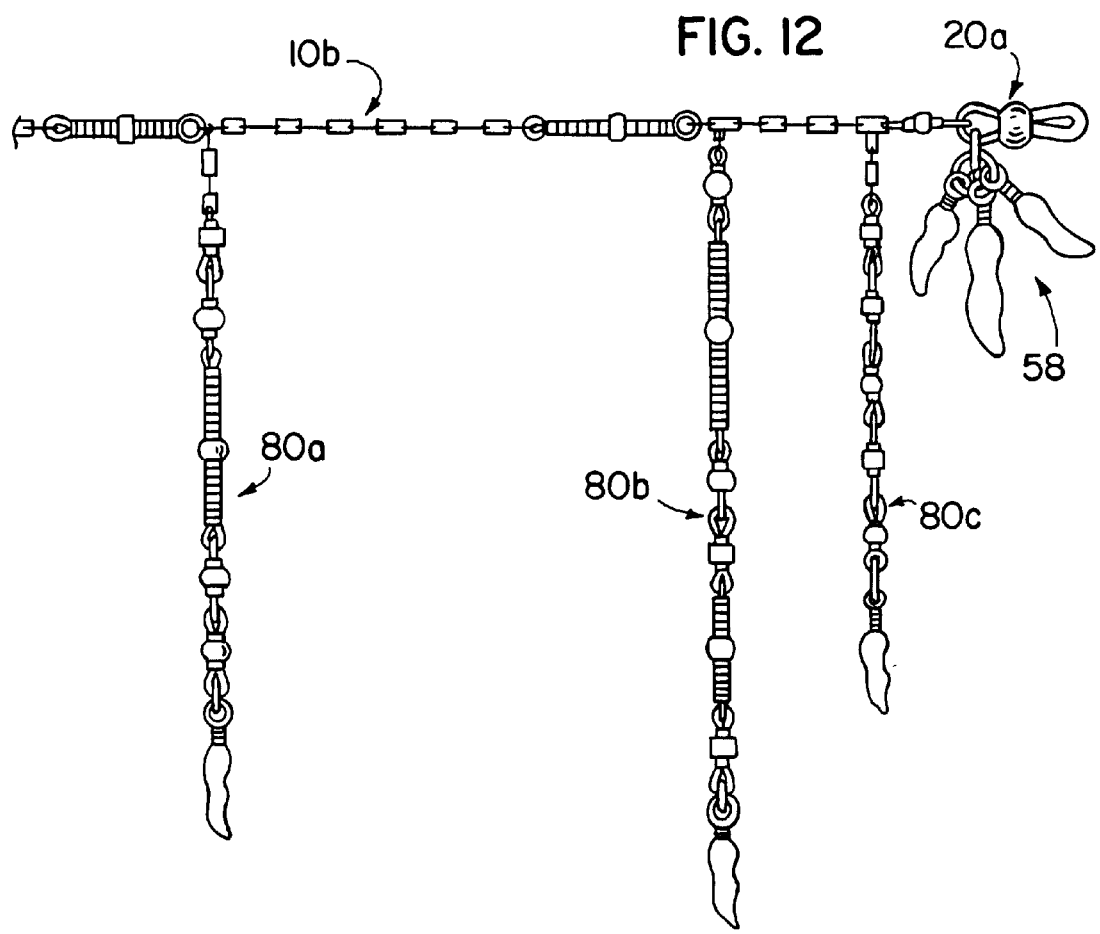
FIG. 12 is a partial plan view of the jewelry article of FIG. 11.

Referring to FIGS. 11 and 12, another embodiment of the glasstension is shown as glasstension 10b, and may be formed in a manner similar to the embodiment of FIGS. 6–9 and 10a–10d, but with the first and second gripping members 20a and 20b disposed at the ends of the strands 30. The glasstension 10b also includes the third gripping member 20c which is attached and used in the same manner as in the embodiment of FIGS. 6–9 and 10a–10d, although it is not visible in the views of FIGS. 11 and 12. Since the glasstension 10b does not have the terminal ends 55 as in the previous embodiment, additional decorative strands 80a–80c are attached at spaced locations extending down from the first and second gripping members 20a and 20b. These decorative strands 80a–80c, in effect, take the place of the terminal ends 55 of the previous embodiment, to provide a glasstension appearance when used in both the first operative configuration as a single-sided glasstension (not shown), and in the second operative configuration as a combined double-sided glasstension and eyeglass holder (FIG. 11).

I claim:

1. Ornamental eyewear, comprising:
   an eyeglass frame having a pair of temple arms;
   first, second and third gripping members, each receivable on the temple arms of the eyeglass frame;
   first and second decorative strands, each of which includes a first end and a second end, the first and second strands being connected to one of the first and second gripping members, respectively;
   an end of each of the first and second decorative strands being connected to an attachment anchor, thus forming a necklace portion between the first and second gripping members, the necklace portion having a center;
   the attachment anchor being operative for attaching the third gripping member to said necklace portion;
   wherein the eyewear is convertible between a first operative configuration in which the attachment anchor is attached to the third gripping member and the third gripping member is received on a single one of the eyeglass temple arms to provide a single sided decoration, and a second operative configuration in which the first and second gripping members are received on opposite temple arms of the eyeglass frame to provide a double sided decorative effect as well as a capability to function as an eyeglass retainer.

2. The ornamental eyewear as recited in claim 1 in which the first and second decorative strands have unequal lengths, such that the attachment anchor is offset from the center of the necklace portion.

3. The ornamental eyewear as recited in claim 1 in which the first and second gripping members are attached to the first and second strands, respectively, at an attachment point located between the first and second ends of each decorative strand, thereby forming a terminal end on each decorative strand which extends beyond the attachment point to provide a decorative effect in both the first and second operative configurations.

4. The ornamental eyewear as recited in claim 3 which includes means for attaching jewelry accessories onto the first and second decorative strands at the attachment point of the first and second gripping members.

5. The ornamental eyewear as recited in claim 4 in which the means for attaching jewelry is readily releasable from the first and second decorative strands, such that plural jewelry accessories may be added, removed, and interchanged.

6. The ornamental eyewear as recited in claim 1 which includes means for attaching jewelry accessories onto the first and second decorative strands at spaced apart locations extending back from the first and second gripping members towards the attachment anchor.

7. The ornamental eyewear as recited in claim 1 in which the third gripping member is fixedly attached onto the attachment anchor.

8. The ornamental eyewear as recited in claim 7 in which the attachment anchor is formed by a decorative member having a solid body formed with separate attachment points for the third gripping member and the first and second decorative strands.

9. The ornamental eyewear as recited in claim 1 in which the third gripping member is releasably attachable to the attachment anchor for removal in the second operative configuration.

10. The ornamental eyewear as recited in claim 9 in which the attachment anchor comprises a releasable clasp for attaching to the third gripping member, with the releasable clasp being fixedly attached together with the second ends of the first and second decorative strands.

11. The ornamental eyewear as recited in claim 9 in which the attachment anchor comprises a fixed ring fixedly attached together with the second ends of the first and second decorative strands, and releasable attachment of the third gripping member is provided by a releasable clasp fixedly attached onto the third gripping member for releasably engaging the fixed ring of the attachment anchor.

12. The ornamental eyewear as recited in claim 9 in which the attachment anchor comprises an intermediate strand connected between two stopping members, in which each stopping member connects to the second end of one of the first and second decorative strands to form the necklace portion, and in which releasable attachment of the third gripping member is provided by a releasable clasp fixedly attached onto the third gripping member, the releasable clasp being releasably engagable around the intermediate strand but with an interior area small enough to be held captive between the stopping members.

* * * * *